United States Patent Office 3,652,520
Patented Mar. 28, 1972

3,652,520
POLYMERS OF POLYMERIZABLE POLYDIENE ETHYLENICALLY UNSATURATED ESTERS
Patrick W. Ryan, Chicago Heights, and Ronald E. Thompson, Park Forest, Ill., assignors to Atlantic Richfield Company, New York, N.Y.
No Drawing. Filed Mar. 22, 1968, Ser. No. 715,155
Int. Cl. C08f 3/62, 15/18
U.S. Cl. 260—86.1        14 Claims

ABSTRACT OF THE DISCLOSURE

Polymerizable polydiene ethylenically-unsaturated esters having at least about one terminal, ethylenically-unsaturated acyloxy group are obtained by esterifying certain intermediate polyhydroxy polymers with an acyl compound, reactive with hydroxyl to form an ester, and having its acyl group ethylenically-unsaturated, such as acrylic, crotonic or methacrylic acid. The usually liquid intermediate polyhydroxy polymer has an average of at least about 1.8 predominantly primary, terminal, allylic hydroxyl groups per molecule and is an addition polymer containing 0 to about 75% by weight of the residue of an alpha-monoolefin, such as styrene, and 25 to 100% of the residue of a 1,3-diene, such as butadiene, the intermediate polyhydroxy polymer having a viscosity at 30° C. of about 5–20,000 poises, having the majority of its unsaturation in the main carbon chain, and a number average molecular weight of about 400 to 25,000. These usually liquid polydiene ethylenically-unsaturated esters contain terminal, allylic, ethylenically unsaturated acyloxy or ester groups and are capable of further polymerization through these unsaturated end groups to produce homopolymers and copolymers with polymerizable vinyl monomers, such as styrene, ranging in properties from soft rubbers to high impact plastics. These ethylenically-unsaturated esters can be used as modifiers in various plastic and other poly-ester compositions to improve flexibility, electrical properties and hydrolytic stability.

---

This invention relates to polymerizable unsaturated esters and to homopolymers and copolymers thereof. More particularly, this invention relates to ethylenically-unsaturated esters of hydroxyl-terminated polydiene resins, to homopolymers and copolymers thereof and to plastic and polyester compositions containing these ethylenically-unsaturated esters and polymers thereof. It has been found in accordance with this invention that certain, usually liquid, intermediate polyhydroxy polymers having an average of at least about 1.8 predominantly primary, terminal, allylic hydroxyl groups per molecule can be esterified with an acyl compound, reactive with hydroxyl to form an ester, and having its acyl group ethylenically unsaturated, such as ethylenically-unsaturated acids, to form usually liquid, polymerizable polydiene ethylenically-unsaturated esters having an average of at least one and usually at least about 1.8 or about 2 or more, terminal, allylic, ethylenically-unsaturated acyloxy groups, preferably of 3 to about 12 carbon atoms, such as acrylyloxy, crotonyloxy and methacrylyloxy groups. These usually liquid polydiene ethylenically-unsaturated esters can be further polymerized through the ethylenically-unsaturated acyloxy group to produce homopolymers and copolymers with polymerizable vinyl monomers, such as styrene, ranging in properties from soft rubbers to high impact plastics.

The intermediate polyhydroxy polymers have an average of at least about 1.8 predominantly primary, terminal, allylic hydroxyl groups per molecule and are an addition polymer containing 0 to about 75% by weight of the residue of an alpha-monoolefin of 2 to about 12 carbon atoms and about 25 to 100% of the residue of a 1,3-diene of 4 to about 12 carbon atoms, the intermediate polyhydroxy polymer having a viscosity at 30° C. of about 5–20,000 poises, having the majority of its unsaturation in the main carbon chain, and a number average molecular weight of about 400 to 25,000. The intermediate polyhydroxy polymers used in this invention are particular hydroxyl-terminated polymers and copolymers of dienes with other reactive monomers and can be prepared by the hydrogen peroxide-isopropanol mutual solvent process described hereinafter. In addition, suitable derivatives derived therefrom are also applicable provided the alcohol moiety of the polymer with its primary, terminal, allylic structure remains intact. These include partially hydrogenated or halogenated hydroxyl-terminated polybutadiene resins having the majority of its unsaturation in the main carbon chain.

The intermediate polyhydroxy polymer has a particular structure and contains allylic hydroxyl groups, which usually are at the ends of the main, that is the longest, hydrocarbon chain of these usually liquid diene polymers. These intermediate polyhydroxy polymers differ from the homopolymers and copolymers of butadiene and related dienes which are commercially available as GR–S rubber, etc. The intermediate polyhydroxy polymers may, in general, have a viscosity at 30° C., of about 5–20,000 poises, preferably about 15 to 5000 poises. Often the intermediate polymer, when a homopolymer, is obtained in a viscosity range of about 20 to 300 or up to about 550 poises at 30° C. Preferably, the intermediate polyhydroxy polymers have a viscosity of about 35 to 60 or up to about 190 to 260 poises. Thus, the intermediate polyhydroxy polymers are liquids or semi-solids flowable, at least when subjected to moderate pressure, at ambient temperatures or at temperatures up to about 400° F. The allylic hydroxy-terminated intermediate polymers used in the present invention will have molecular weights in the range of about 400 to about 25,000 as determined by cryoscopic ebullioscopic or osomometric methods. The preferred hydroxyl-containing diene polymers will be in the molecular weight range of about 900 to 10,000. In contrast, conventional diene polymers such as GR–S rubber are extremely high in molecular weight, e.g., in the range of several hundred thousand.

The hydroxy-terminated diene intermediate polymers employed to make the novel compositions of this invention differ from diene polymers known to be telechelic and/or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2, frequently 2.1 to 2.8 and up to about 3 or more hydroxyl groups are present on the average per intermediate polymer molecule. Since these hydroxyl groups are predominantly primary, terminal and allylic in structure, with approximately two of the hydroxyl groups being at terminating positions on the main carbon chain, the polymers are highly reactive. The intermediate polyhydroxy polymer has the majority of its unsaturation in the main hydrocarbon chain and this appears to provide polymers of improved elasticity characteristics.

The dienes which are employed to make the intermediate polymers include the unsubstituted, 2-substituted or 2,3-disubstituted 1,3-dienes or 4 up to about 12 carbon atoms. The diene preferably has up to 6 carbon atoms and the substituents in the 2- and/or 3-position may be hydrogen, alkyl, generally lower alkyl, e.g. of 1 to 4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2-phenyl-1,3-butadiene, 2-methyl-3-phenyl-1,3-butadiene, etc. The choice of diene will usually depend upon properties desired in the final elastomer, for example, chloroprene may be used, alone or in admixture with other dienes to produce oil-resistant and flameproof rubbers.

Although intermediate polymers of the above described type, averaging more than one predominantly primary hydroxyl per molecule, say about 1.8 to 3 or more per molecule, may be employed in this invention, they preferably have an average of at least 2 or about 2.1 to 2.4 up to 2.8 hydroxyl groups per molecule and the hydroxyl groups are predominantly in terminal, allylic positions on the main, generally longest, hydrocarbon chain of the molecule. By "allylic" configuration is meant the alpha-allylic grouping of allylic alcohol, that is the terminal hydroxyls of the intermediate polymer are attached to a carbon adjacent to a double-bond carbon. Preferably, the polymer is substantially free of other hydroxyl groups in order to avoid indiscriminate, premature or excessive cross-linking.

The ratio of cis-1,4 and trans-1,4 and 1,2-vinyl unsaturation which occurs in the diene polymers used in the present invention, the number and location of the hydroxyl groups and the molecular weight of the intermediate polymers can be a function of polymerization temperature and the type of addition polymerization system employed in forming the polymer. It has been found that diene polymers of the desired configuration can be obtained using hydrogen peroxide as the catalyst for polymerization in a mutual alcohol solvent system. This free-radical addition polymerization usually takes place in solution at a temperature of about 30° C. to 200° C., preferably about 100–150° C.

The reaction preferably takes place in a mutual solvent system; that is, one which dissolves both the diene monomer and the hydrogen peroxide. Suitable solvents are isopropanol, methanol, sec-butanol, n-butanol, n-propanol and like saturated alcohols, preferably alkanols having 2 to about 12 carbon atoms. The $H_2O_2$-solvent system is found to supply hydroxyl groups and the catalytic and solvent effects needed to produce the intermediate diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1% to 15% of the reaction mixture to assure a low molecular weight addition polymer product having more than two hydroxyl groups per molecule.

The usable intermediate polyhydroxy polymers of butadiene will have the majority of their unsaturation in the main carbon chain and will conform to the following simplified chemical structure:

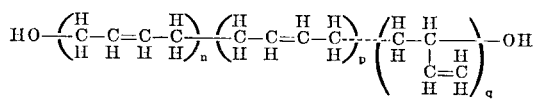

in which $n$ plus $p$ is greater than $q$, that is, the inchain unsaturation accounts for more than 50% of the unsaturation. One or more of the hydrogens appearing in the above formula may be replaced by hydroxyl in some of the molecules. This formula should not be understood as implying that the polymers are necessarily in blocks, but the cis-1, 4-, trans-1, 4- and vinyl (1,2) unsaturation are usually distributed throughout the polymer molecule. Generally $n$ will be a number sufficient to give a cis-1,4-unsaturation content of about 10–30 percent; $p$ will be a number sufficient to give a trans-1,4-unsaturation content to the polymer in the range of about 40–70 percent while $q$ will be sufficient to give a pendant 1,2-vinyl unsaturation of about 10–35 percent. Often the polymer will contain largely trans-1,4-units e.g., about 50–65 percent and about 15–25 percent cis-1,4-units, with about 15–25 percent 1,2-units. Branching may also occur in the above polymers, especially those prepared at higher temperatures. These hydroxyl terminated polybutadiene resins are usually low molecular weight liquid polymers composed mainly of butadiene units in their backbone structure.

Olefinically-unsaturated monomers may be incorporated into the diene intermediate polymer products used in this invention and these may often be components which provide cross-linking sites. Usable monomers include alpha-monoolefinic materials of about 2 to 3 to 10 or about 12 carbon atoms, such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of monoolefinic monomer employed will often be determined on the basis of properties desired in the final elastomer resin. For example, solvent-resistant rubbers may be formulated by copolymerization of butadiene with acrylonitrile, or other monoolefin, substituted with a non-hydrocarbon radical, to produce the intermediate polymer. Generally the amount of monoolefinic monomer in the polymer will be 0 to about 75% by weight of the total addition polymer, preferably about 1 to 40% or even about 10–40%, and the balance can be essentially the 1,3 diene.

In addition to the homopolymers and copolymers comprise of single dienes and single monoolefinic or vinyl monomers, the present invention may also use intermediate polymers made from combinations of a plurality of dienes and monoolefinic monomers. For example, mixtures of butadiene, isoprene and styrene can be polymerized to afford low molecular weight hydroxyl-containing interpolymers. Various combinations of dienes and monoolefinic monomers may be copolymerized to produce hydroxyl-containing copolymers or interpolymers which may be used to form elastomers. Also, the polymer materials used in this invention may be given improved oxidation and ozone resistance by hydrogenating the hydroxyl-containing diene polymers to their corresponding more hydroxyl-containing diene polymers to their corresponding more-saturated derivatives. Usually, the hydroxyl-containing diene polymers used in the present invention will at most be only partially hydrogenated, so as to provide a material which is more stable due to diminished unsaturation but which still has good elastomer properties.

The main criteria for the unsaturated acid or acyl compound is that once reacted with the hydroxyl terminated polydiene resin, the acyl compound introduces a reactive polymerizable double bond into the liquid polydiene resin. One type of unsaturated acid or acyl compound which can be used is represented by the following structure:

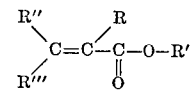

wherein R=H, alkyl, —$CO_2R'$, CN, halogen, or phenyl R'=H, alkyl, or aromatic, such as phenyl, and R″ and R‴=H, alkyl, aromatic, such as phenyl, CO$_2$R′, $$-\underset{\underset{O}{\|}}{C}-R$$

or CN.

Various ethylenically-unsaturated acyl compounds reactive with hydroxyl to form an ester and having the acyl group ethylenically-unsaturated, preferably of 3 or 4 to about 12 carbon atoms, can be used. Thus there can be used an acrylyl or methacrylyl compound, such as acrylic acid, acrylyl chloride or other halide, methyl acrylate, methacrylic acid, methacrylyl chloride or other halide, and methyl methacrylate. Crotonic acid, crotonyl halide and methyl crotonate are illustrative of other unsaturated acyl compounds which can be used. It is preferable to employ an aliphatic hydrocarbon ethylenically unsaturated acyl compound of 3 or 4 to about 12 carbon atoms in the acyl group and which may have terminal ethylenic unsaturation, i.e., a terminal methylene group at the end of the acyl group. This affords active terminal, ethylenic unsaturation in the allylic acyloxy end groups of the polydiene polymers thus facilitating further polymerization. The polydiene polymer is often fully acylated, although it can be only partially acylated. When the polydiene polymer is fully acylated, it will have per molecule an average number of predominantly primary, terminal, allylic, ethylenically-unsaturated acyloxy groups corresponding in number to the predominantly primary, terminal, allylic, hydroxy groups which were in the unacylated polydiene polymer.

Any suitable method of esterification of the intermediate polyhydroxy polymer can be used to prepare the unsaturated polydiene esters and polyesters of this invention including direct esterification with an ethylenically-unsaturated acid, transesterification with an ethylenically-unsaturated ester, and esterification with an ethylenically-unsaturated acyl chloride or other halide. In addition other suitable methods of esterification, including use of conventional esterification catalysts, can be used to prepare the unsaturated polydiene esters and are applicable. By suitably adjusting the ratio of mole equivalents of the ethylenically-unsaturated acyl compound to the mole equivalents of the intermediate polyhydroxy polymer, the mono-ester can be obtained. Usually an excess of ethylenically-unsaturated acyl compound is used to obtain the polyester.

The reaction of polyhydroxybutadiene with acrylic acid halide can be depicted as follows:

HO—CH$_2$—CH=CH—polybutadiene—CH=CH—CH$_2$—OH+X—$\underset{\underset{O}{\|}}{C}$—CH=CH$_2$ (X=halogen) ⟶
                   residue CH$_2$=CH—$\underset{\underset{O}{\|}}{C}$—O—CH$_2$—CH=CH—polybutadiene—CH=CH—CH$_2$—OH+X—$\underset{\underset{O}{\|}}{C}$—CH=CH$_2$ ⟶
                             (unsaturated mono-ester)

CH$_2$=CH—$\underset{\underset{O}{\|}}{C}$—O—CH$_2$—CH=CH—polybutadiene—CH=CH—CH$_2$—O—$\underset{\underset{O}{\|}}{C}$—CH=CH$_2$
                            residue (unsaturated polyester or fully acylated unsaturated ester)

The homo and copolymerization of the unsaturated esters of hydroxyl terminated polydiene resins can be accomplished by known suitable polymerization techniques. These include free radical initiated polymerization using suspension, emulsion, solution, or bulk techniques, and anionic induced polymerization methods.

The infra-red absorption spectra of the polybutadiene polyacrylate, polybutadiene polymethacrylate and polybutadiene polycrotonate are in agreement with the structures herein disclosed.

Polymerization of unsaturated polyesters of hydroxyl terminated polydiene resins proceeds mainly through the reactive double bonds contained in the ester moieties of the liquid polymers. For example, homopolymerization of the acrylic polyester of polybutadiene may be depicted as follows:

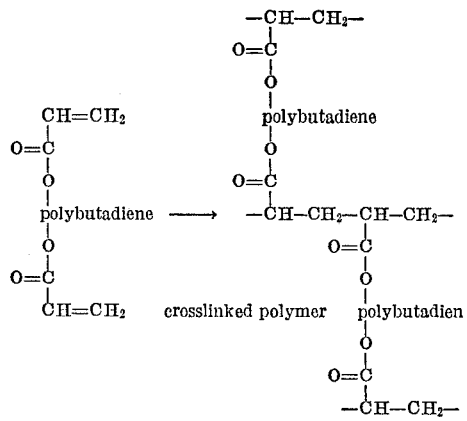

Copolymers and terpolymers of liquid unsaturated esters of hydroxyl-terminated polydiene resins with other reactive vinyl monomers can be prepared via the polymerization techniques described above. Included in this class of reactive vinyl monomers are styrene, acrylonitrile, acrylate esters, methacrylate esters, acrylamides, and in general polymerizable vinyl monomers, preferably of 2 or 3 to about 12 carbon atoms, represented by the formula:

$$CH_2=\underset{\underset{R'}{|}}{C}-R$$

Where R=aromatic, such as phenyl, CN, CO$_2$H, CO$_2$R″, F, Cl, Br, $$O-\underset{\underset{O}{\|}}{C}-R''$$

alkyl, or H.

R′=F, Cl, Br, H, aromatic, such as phenyl, or alkyl

R″=H, alkyl, or aromatic, such as phenyl. For example, copolymerization of the acrylic polyester of polybutadiene and styrene may be depicted as follows:

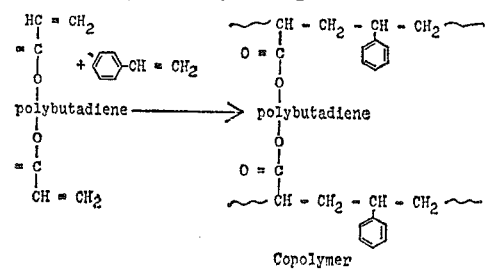

Copolymers with similar properties to the above polyester copolymers but which are thermoplastic are prepared from the unsaturated mono-esters of polybutadiene resins and reactive vinyl comonomers as depicted below with polybutadiene acrylate monoester and styrene.

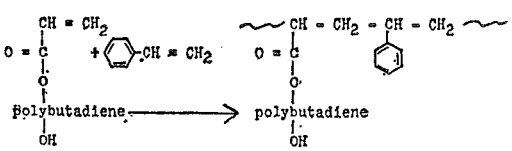

The proportion of unsaturated ester of the intermediate polyhydroxy polymer to the polymerizable vinyl monomer in the copolymers can be by weight from about 1 to 100%, and often is about 5% to 60% up to 100%. For example, often about 55–70% of the unsaturated ester with about 30–45% of vinyl monomer, as styrene, is used.

The unsaturated esters of polybutadiene resins can be used to modify known polymers via copolymerization techniques and introduce increased flexibility and impact resistance. For example, polystyrene is known to be a very brittle polymer having very low impact properties. Copolymerizing styrene with small amounts of unsaturated esters of polybutadiene resins affords flexibility and impact resistance in the resultant high styrene content copolymer.

Copolymers containing about 50% or higher unsaturated ester of polybutadiene resins and the remainder reactive vinyl comonomer are generally elastomeric in nature and can be used to advantage to prepare a variety of general purpose rubbers as well as specialty rubbers. These elastomeric compositions can be used in the preparation of rubber goods as well as elastomeric caulks, sealants, adhesives, missile fuel binders, etc.

Speciality rubbers having high comonomer contents in relation to presently available rubbers are now possible. For example, nitrile-derived components in conventional nitrile rubber are limited to concentrations of about 40%. Higher nitrile content rubbers made by conventional techniques cannot be processed. Copolymerization of unsaturated esters of polybutadiene resins with acrylonitrile as comonomer can be carried out to provide elastomers having an acrylonitrile-derived component up to, for instance about 50%. These high nitrile content elastomers exhibit superior solvent resistance. Other examples of rubbers which can be prepared with high comonomer contents from unsaturated esters of polybutadiene resins are high styrene rubbers, high acrylate ester rubbers having good high temperature and oil resistance properties, and high vinyl acetate rubbers.

The following examples are illustrative of various embodiments of this invention and include preferred embodiments.

EXAMPLE A

Four hydroxyl-terminated polybutadiene polymers are described as being exemplary of those which can be used in the present invention.

Polybutadiene 45 is a polyhydroxybutadiene homopolymer typically having a viscosity of 46 poises at 30° C., a hydroxyl content of 0.84 meq./gm., a hydroxyl number (mg. KOH/gm.) of 47, an average molecular weight of 2700, about 2.3 terminal, allylic, hydroxyl groups which are predominantly primary, and an iodine number of 395. The polymer can be prepared by polymerizing 100 parts of butadiene in the presence of 70 parts of isopropanol and 10 parts of hydrogen peroxide in an aluminum clad autoclave at 118° C. for 2 hours.

Polybutadiene 15 is a polyhydroxybutadiene homopolymer typically having a viscosity at 30° C. of 170 poises, a hydroxyl content of 0.71 meq./gm., a hydroxyl number (mg. KOH/gm.), of 45, an average molecular weight of 3400, about 2.4 terminal, allylic, hydroxyl groups which are predominantly primary and an iodine number of 395. This polymer can be made by polymerizing 100 parts of butadiene in the presence of 35 parts of isopropanol and 6 parts of hydrogen peroxide for 2½ hours at 130° C.

Styrene-butadiene copolymer 15 typically has a molecular weight of about 3400, a viscosity at 30° C. of 225 poises, a hydroxyl content (meq./gm.) of 0.71, a hydroxyl number of 50 mg.KOH/gm., about 2.4 terminal, allylic, hydroxyl groups which are predominantly primary; and an iodine number of 335. The copolymer is made by polymerizing 75 parts butadiene and 25 parts styrene in the presence of 70 parts isopropanol and 10 parts of 50% hydrogen peroxide for 2½ hours at 120° C.

Acrylonitrile copolymer 15 typically has a viscosity of 570 poises at 30° C., a hydroxyl content of 0.62 meq./gm., and hydroxyl number of 45 mg. KOH/gm., an average molecular weight of 4000, about 2.5 terminal, allylic, hydroxyl groups, which are predominantly primary, and an iodine number 345. This polymer can be made by copolymerizing acrylonitrile with butadiene in isopropanol solvent and in the presence of hydrogen peroxide using the following ratio of reactants; 85 parts butadiene, 15 parts acrylonitrile, 70 parts isopropanol, 10% hydrogen peroxide. The reactants are heated in an autoclave at 118° C. for 1½ hours and stripped.

EXAMPLE I

Preparation of polybutadiene 45 acrylate

A solution of 238 g. (0.200 equivalents) of Polybutadiene 45 and 2.77 g. of hydroquinone (1.0% of total reactants weight) was stirred in 400 ml. of benzene under a nitrogen atmosphere without heating. Then 36.21 g. (0.400 equivalents, 100% excess) of acrylyl chloride was added with constant stirring over the course of 2.0 hours. The reaction solution was then heated to 49.0±0.5° C. with stirring for 160 hours.

After the reaction solution had been cooled to room temperature, it was extracted four times with 100 ml. portions of 2.5% sodium hydroxide, followed by five extractions with 100 ml. portions of water. After being dried over anhydrous magnesium sulfate and filtered, the solution was placed in a flash evaporator and the bulk of benzene removed under plant vacuum to a pot temperature of 60° C. The last traces of volatile matter were removed under a vacuum of 0.1 mm. of mercury at a pot temperature of 60° C.

At this point the material was a slightly cloudy, light yellow, viscous oil. Quantitative elemental analysis gave the following results: Calcd., Carbon: 86.64%, Hydrogen 10.79%; Found: Carbon: 86.23%, Hydrogen: 10.79%. An infrared analysis of this product as in excellent agreement with the structure for the fully acylated ester, Polybutadiene 45 acrylate. As the infrared spectrum showed no absorption attributable to hydroxyl groups, this indicated that all of the hydroxyl groups had been acylated. The yield of this material was 208 g. (83.6% yield).

EXAMPLE II

Preparation of polybutadiene 45 methacrylate

A mixture of 119 g. of polybutadiene 45 (0.100 equivalents), 50.06 g. of methyl methacrylate (0.500 equivalents; 400% excess), and 1.71 g. of hydroquinone (1.0% of total reactants weight) was heated to the vicinity of 90° C. with constant stirring. At this temperature a total of 2.0 ml. of catalyst (tetra-iso-propyl titanate) was added over the course of 3.0 hours. The temperature of the reaction was then increased to the vicinity of 105° C. for an additional 23.0 hours. At this point the heating was discontinued and the reaction mixture was cooled to room temperature.

The crude reaction mixture was stirred with 100 ml. of benzene and 100 ml. of water. The resulting emulsion was centrifuged; the deep red supernatant liquid was decanted, dried over anhydrous magnesium sulfate, and filtered. The bulk of the benzene and unreacted methyl methacrylate was removed on the flash evaporator under plant vacuum to a pot temperature of 60° C. The residual volatiles were removed at a pressure of 0.1 mm. of mercury to a pot temperature of 60° C.

At this point the material was a clear, deep red, mobile liquid. Quantitative elemental analysis gave the following results: Calculated, Carbon: 86.15%, Hydrogen: 10.80%; Found, Carbon: 86.31%, Hydrogen: 10.85%. An infrared absorption spectrum of a sample of this material was in excellent agreement with the structure for the fully acylated ester, polybutadiene 45 methacrylate. The yield of this material was 119 g. (94.6% yield).

EXAMPLE III

Preparation of polybutadiene 45 crotonate

A mixture of 50 g. of polybutadiene 45 (0.0420 equivalents), 21.04 g. of methyl crotonate (0.2100 equivalents), and 0.72 g. of dibutyl tin oxide (1.0% of total weight) was heated in an oil bath to 90±1° C. for 28.0 hours with constant stirring under a nitrogen sweep. After cooling, the reaction mixture was filtered through a fine glass filter under plant vacuum. The slightly cloudy, slightly yellow oil was then stripped of the excess methyl crotonate under a high vacuum (0.25 mm. Hg) at a temperature of 60° C. for two hours on a rotary evaporator. An infrared analysis of this product showed no absorption attributable to residual hydroxyl functionality. The yield of this material, the fully acylated ester, polybutadiene 45 crotonate, was 52.85 g. (99.98% of theory). Quantitative elemental analysis gave the following results: Calc., Carbon: 86.63%, Hydrogen: 100.83%. Found: Carbon 86.32%, Hydrogen: 10.84%.

EXAMPLE IV

Homopolymer of polybutadiene 45 acrylate

The liquid polybutadiene 45 acrylate of Example I was homopolymerized in bulk with 1.0 weight percent benzoyl peroxide at 80% C. for 24 hours. The resulting homopolymer was a rubber.

EXAMPLE V

Polybutadiene 45 acrylate-styrene copolymers

These monomers, polybutadiene 45 acrylate prepared as in Example I and styrene, were copolymerized at various monomer ratios using the following method. Weighed amounts of the comonomers were placed in a polymerization vessel along with 2.0% benzoyl peroxide (by weight on total monomers). The resulting solution was stirred at 80° C. until a pourable near gel was obtained. At this point the reaction contents were poured into a 6" x 6" x ⅛" mold and allowed to react at 80° C. for 16 hours.

The resulting copolymer castings were used to prepare standard test specimens.

Polymerization of unsaturated esters of hydroxyl-terminated polybutadiene resins either by themselves or with other comonomers as herein described results in materials which vary from soft rubbers to high impact plastics. These materials are not thermoplastic and are crosslinked due to the presence of 2+ unsaturated ester moieties on the polybutadiene resins.

Table I shows the physical properties of copolymers prepared from the acrylate ester of polybutadiene 45 and styrene. As the styrene content increased the copolymers produced transformed from soft rubbers to elastoplastics and finally, into materials similar in properties to high impact styrene.

TABLE I.—STYRENE-POLYBUTADIENE 45 ACRYLATE COPOLYMERS

| Test | A | B | C |
| --- | --- | --- | --- |
| Monomer composition, wt. percent: | | | |
| Polybutadiene 45 acrylate | 50 | 33 | 20 |
| Styrene | 50 | 67 | 80 |
| Properties of copolymer: | | | |
| Tensile strength, p.s.i | 718 | 3,200 | 2,700 |
| 100% modulus, p.s.i | 320 | 1,320 | 1,770 |
| Tear strength, p.l.i | 37 | 270 | 480 |
| Percent elongation | 160 | 210 | 180 |
| Shore A Hardness | 63 | 92 | 95 |
| Melting point | (¹) | (¹) | (¹) |
| Appearance | Clear | Clear | Clear |
| Classification | (²) | (³) | (³) |

¹ Does not melt below 300° C.
² Elastomer.
³ Elastoplastic.

Products made from 90% to 95% or more of styrene and up to about 10% of polybutadiene 45 acrylate copolymer are thermoplastic and can be remolded under pressure at temperatures of about 120–150° C. As can be seen from the foregoing data polyacrylate esters of polybutadiene resins are effective monomers for crosslinking and introducing flexibility and impact resistance into styrene polymers.

The 50% styrene copolymer is a crosslinked elastomeric material which can be carbon black reinforced and oil extended. It has excellent electrical properties, good abrasion resistance and excellent low temperature properties. This elastomer when properly compounded with reinforcing aids can be used in the preparation of a variety of liquid castable rubber articles including rubber wheels, gears, bushings, rollers, and solid and pneumatic tires. Numerous additional advantages can be listed for the styrene copolymers, which include a liquid castable monomer system and a room temperature peroxide cure system.

EXAMPLE VI

Polybutadiene 45 acrylate methyl methacrylate copolymers

Other plastic materials which can be modified by unsaturated esters of polybutadiene resins include polymethacrylate and polyester plastics. For example, copolymerization of methyl methacrylate with 5–30% polybutadiene 45 polyacrylate resulted in materials having increased flexibility and scratch resistance when compared with unmodified poly(methylmethacrylate).

A solution of 35.00 g. of Polybutadiene 45 acrylate as prepared in Example I, 140.00 g. of methyl methacrylate, and 1.75 g. of benzoyl peroxide was prepared by stirring these materials at 60° C. for about five minutes. The total reactants charge of 175.00 g. was composed of 80.0% methyl methacrylate and 20.0% polybutadiene polyacrylate; the benzoyl peroxide was present at 1.0% of the total reactants charge. This solution was poured into the standard vertical mold, previously described. The mold was placed into the oven and held at 130° F. for 88 hours. Upon cooling and demolding, the homogeneous casting possessed more flexibility than a similar casting, prepared without the polybutadiene polyacrylate.

EXAMPLE VII

Copolymers of 5% polybutadiene 45 acrylate and 95% styrene

A solution of 7.50 g. of Polybutadiene 45 acrylate prepared as in Example I, 142.50 g. of styrene, and 1.50 g. of benzoyl peroxide was prepared by stirring these materials at 60° C. for about ten minutes. The total reactants charge of 150.00 g. was composed of 95.0% styrene and 5.0% polybutadiene acrylate, by weight; the benzoyl peroxide was present at 1.0% of the total reactants charge. This solution was poured into a vertical 10" x 10" cavity produced by a ⅛" spacer of suitable dimensions clamped between two 30 gauge stainless steel sheets, backed by ½" thick plywood forms. This mold was then placed into an oven, thermostatically controlled at 130±2° F. for 88 hours. A fluorocarbon mold release agent was employed, which had been previously baked onto the steel plates. The resulting homogeneous semiflexible plastic casting displayed the properties of a high impact plastic. Pieces of this plastic material could be remolded into a homogeneous sheet in a standard 5" x 5" x ¹⁄₁₆" compression mold by heating at 120–150° C. for one-half to two hours under pressure.

The crotonate and methacrylate esters of Polybutadiene 45 having unsaturated acyl moieties can be homopolymerized and copolymerized with vinyl monomers in the same manner as the acrylate esters of Polybutadiene 45 to give products varying in properties from highly flexible elastomers through semi-flexible elastoplastics to strong, high-impact plastics.

If desired, additional materials, such as extenders and finely divided solid fillers can be incorporated, especially prior to polymerization, in the polymers and copolymers of this invention. Some conventional fillers are carbon black, asphaltenes, silica, silica-alumina, hydrated silica, zinc oxide, magnesium carbonate, clays, talc, and pulverized reclaimed rubber as well as other various mineral reinforcing or inert fillers which are known in the art. Solid fillers may be employed, if desired, in the amount of 0–100 or more parts per 100 parts of polymers in the final product, and when used in significant amounts usually at least about 5% is employed, based on the polymers.

It is claimed:

1. The addition homopolymers ranging in physical state from soft rubbers to high impact plastics, of polymerizable polydiene ethylenically-unsaturated ester containing per molecule an average of about 1.8 to 3 terminal, allylic - positioned, ethylenically - unsaturated acyloxy groups of 3 to about 12 carbon atoms and being the esterification product of an intermediate polyhydroxy polymer and an ethylenically-unsaturated acyl compound, said acyl compound being reactive with hydroxyl to form an ester, having its acyl group ethylenically-unsaturated and having 3 to about 12 carbon atoms, and said intermediate polyhydroxy polymer having an average of about 1.8 to 3 predominantly primary, terminal, allylic hydroxyl groups per molecule and being a free radical hydrogen peroxide catalyzed addition polymer containing 0 to about 75% by weight of an alpha monoolefin of 2 to about 12 carbon atoms, and about 25 to 100% of a 1,3-diene of 4 to about 12 carbon atoms, said intermediate polyhydroxy polymer having a viscosity at 30° C. of about 5–20,000 poises, having the majority of its unsaturation in the main carbon chain, and a number average molecular weight of about 400 to 25,000.

2. The addition copolymers ranging in physical state from soft rubbers to high impact plastics, of polymerizable polydiene ethylenically-unsaturated ester and polymerizable vinyl monomer of 2 to about 12 carbon atoms, said polymerizable polydiene ethylenically-unsaturated ester containing per molecule an average of about 1.8 to 3 terminal, allylic-positioned, ethylenically-unsaturated acyloxy groups of 3 to about 12 carbon atoms and being the esterification product of an intermediate polyhydroxy polymer and an ethylenically-unsaturated acyl compound, said acyl compound being reactive with hydroxyl to form an ester, having its acyl group ethylenically-unsaturated and having 3 to about 12 carbon atoms, and said intermediate polyhydroxy polymer having an average of about 1.8 to 3 predominantly primary, terminal, allylic hydroxyl groups per molecule and being a free radical hydrogen peroxide catalyzed addition polymer containing 0 to about 75% by weight of an alpha monoolefin of 2 to about 12 carbon atoms, and about 25 to 100% of a 1,3-diene of 4 to about 12 carbon atoms, said intermediate polyhydroxy polymer having a viscosity at 30° C. of about 5–20,000 poises, having the majority of its unsaturation in the main carbon chain, and a number average molecular weight of about 400 to 25,000.

3. The addition homopolymers ranging in physical state from soft rubbers to high impact plastics, of polymerizable polydiene ethylenically-unsaturated ester containing per molecule an average of about 2.1 to 2.8 terminal, allylic-positioned, ethylenically-unsaturated acyloxy groups of 3 to about 12 carbon atoms and being the esterification product of an intermediate polyhydroxy polymer and an ethylenically-unsaturated acyl compound, said acyl compound being reactive with hydroxyl to form an ester, having its acyl group ethylenically-unsaturated and having 3 to about 12 carbon atoms, and said intermediate polyhydroxy polymer having an average of about 2.1 to 2.8 predominantly primary, terminal, allylic hydroxyl groups per molecule and being a free radical hydrogen peroxide catalyzed addition polymer of a 1,3-diene hydrocarbon of 4 to 12 carbon atoms, said intermediate polyhydroxy polymer having a viscosity at 30° C. of about 5–20,000 poises, having the majority of its unsaturation in the main carbon chain, and a number average molecular weight of about 400 to 25,000.

4. The addition copolymers ranging in physical state from soft rubbers to high impact plastics, of polymerizable polydiene ethylenically-unsaturated ester and polymerizable vinyl monomer of 2 to about 12 carbon atoms, said polymerizable polydiene ethylenically-unsaturated ester containing per molecule an average of about 2.1 to 2.8 terminal, allylic-positioned, ethylenically-unsaturated acyloxy groups of 3 to about 12 carbon atoms and being the esterification product of an intermediate polyhydroxy polymer and an ethylenically-unsaturated acyl compound, said acyl compound being reactive with hydroxy to form an ester, having its acyl group ethylenically-unsaturated and having 3 to about 12 carbon atoms, and said intermediate polyhydroxy polymer having an average of about 2.1 to 2.8 predominantly primary, terminal, allylic hyhydroxyl groups per molecule and being a free radical hydrogen peroxide catalyzed addition polymer of a 1,3-diene hydrocarbon of 4 to about 12 carbon atoms, said intermediate polyhydroxy polymer having a viscosity at 30° C. of about 5–20,000 poises, having the majority of its unsaturation in the main carbon chain, and a number average molecular weight of about 400 to 25,000.

5. The homopolymers of claim 3 wherein said 1,3-diene hydrocarbon is butadiene.

6. The copolymers of claim 4 wherein said 1,3-diene hydrocarbon is butadiene.

7. The homopolymers of claim 3 wherein said terminal, ethylenically-unsaturated acyloxy groups are acryl-yloxy groups and said ethylenically-unsaturated acyl compound is an acrylyl compound reactive with hydroxyl to form the acrylic ester.

8. The copolymers of claim 4 wherein said terminal, ethylenically-unsaturated acyloxy groups are acrylyloxy groups and said ethylenically-unsaturated acyl compound is an acrylyl compound reactive with hydroxyl to form the acrylic ester.

9. The homopolymers of claim 3 wherein said terminal, ethylenically-unsaturated acyloxy groups are methacrylyloxy groups and said ethylenically-unsaturated acyl compound is a methacrylyl compound reactive with hydroxyl to form the methacrylic ester.

10. The copolymers of claim 4 wherein said terminal, ethylenically-unsaturated acyloxy groups are methacrylyloxy groups and said ethylenically-unsaturated acyl compound is a methacrylyl compound reactive with hydroxyl to form the methacrylic ester.

11. The addition homopolymers ranging in physical state from soft rubbers to high impact plastics, of liquid polymerizable polydiene ethylenically-unsaturated ester containing per molecule an average of about 2.1 to 2.8 terminal, allylic-positioned, ethylenically-unsaturated acyloxy group selected from the the group consisting of acrylyloxy, crotonyloxy and methacrylyloxy groups, and being the esterification product of a liquid intermediate polyhydroxy polymer and an ethylenically-unsaturated acyl compound selected from the group consisting of acrylyl, crotonyl and methacrylyl compounds, said acyl compound being reactive with hydroxyl to form an ester, and said liquid intermediate polyhydroxy polymer having an average of about 2.1 to 2.8 predominantly primary, terminal, allylic hydroxyl groups per molecule and being a free radical hydrogen peroxide catalyzed addition polymer of 1,3-butadiene, said intermediate polyhydroxy polymer having a viscosity at 30° C. of about 15 to 5000 poises, having the majority of its unsaturation in the main carbon chain, and a number average molecular weight of about 900 to 10,000.

12. The addition copolymers ranging in physical state from soft rubbers to high impact plastics, of liquid polymerizable polydiene ethylenically-unsaturated ester and polymerizable vinyl monomer of 2 to about 12 carbon atoms, said polymerizable polydiene ethylenically-unsaturated ester containing per molecule an average of about 2.1 to 2.8 terminal, allylic-positioned, ethylenically-unsaturated acyloxy groups selected from the group consisting of acrylyloxy, crotonyloxy and methacrylyloxy groups, and being the esterification product of a liquid intermediate polyhydroxy polymer and an ethylenically-unsaturated acyl compound selected from the group consisting of acrylyl, crotonyl and methacrylyl compounds, said acyl compound being reactive with hydroxyl to form an ester, and said liquid intermediate polyhydroxy polymer having an average of about 2.1 to 2.8 predominantly primary, terminal, allylic hydroxyl groups per molecule and being a free radical hydrogen peroxide catalyzed addition polymer of 1,3-butadiene, said intermediate polyhydroxy polymer having a viscosity at 30° C. of about 15 to 5000 poises, having the majority of its unsaturation in the main carbon chain, and a number average molecular weight of about 900 to 10,000.

13. A copolymer of claim 12 wherein said vinyl monomer is styrene.

14. A copolymer of claim 12 wherein said vinyl monomer is methyl methacrylate.

References Cited

UNITED STATES PATENTS

| | | | |
|---|---|---|---|
| 2,332,460 | 10/1943 | Muskat et al. | 260—89.5 |
| 2,692,892 | 10/1954 | Hillyer et al. | 260—486 |
| 2,838,478 | 6/1958 | Hillyer et al. | 260—94.70 X |
| 3,140,303 | 7/1964 | De La Mare et al. | 260—486 |
| 3,175,997 | 3/1965 | Hsieh | 260—85.1 |
| 3,427,366 | 2/1969 | Verdol et al. | 260—85.1 |
| 3,341,509 | 9/1967 | Stang | 260—94.7 |
| 3,475,393 | 10/1969 | Lorenson et al. | 260—885 |

FOREIGN PATENTS

| | | |
|---|---|---|
| 1,282,760 | 12/1961 | France. |

JAMES A. SEIDLECK, Primary Examiner

U.S. Cl. X.R.

260—85.5, 86.7, 89.5, 94.7, 486, 879, 880